Aug. 15, 1972   F. F. ROGERS, JR   3,684,642
CORRUGATED PACKAGING FILM AND ITS PREPARATION
Filed Feb. 9, 1971
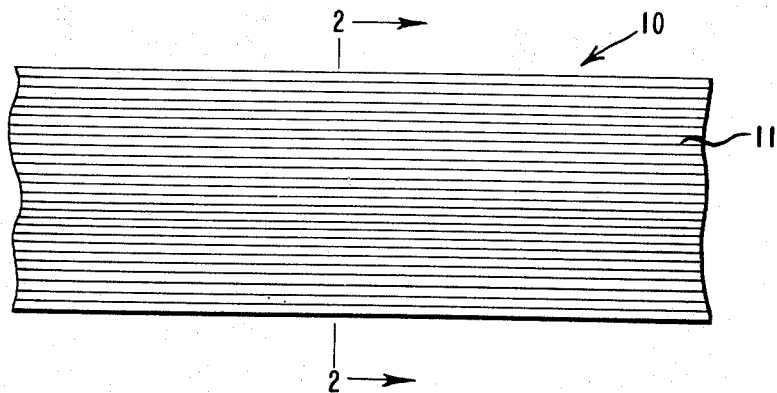
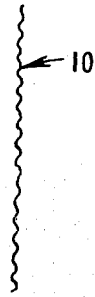 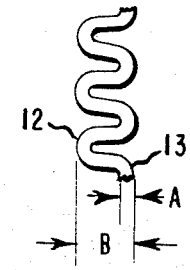
INVENTOR
FULTON FLOYD ROGERS, JR.
BY Francis H. Paintin
ATTORNEY United States Patent Office 3,684,642
Patented Aug. 15, 1972

3,684,642
**CORRUGATED PACKAGING FILM
AND ITS PREPARATION**
Fulton Floyd Rogers, Jr., Richmond, Va., assignor to
E. I. du Pont de Nemours and Company, Wilmington,
Del.
Filed Feb. 9, 1971, Ser. No. 113,849
Int. Cl. B32b 3/28
U.S. Cl. 161—135           10 Claims

ABSTRACT OF THE DISCLOSURE

A corrugated, vinylidene chloride polymer-coated, polymeric packaging film (e.g., cellophane, polyester, polypropylene, high-density polyethylene films, and laminates thereof, and the like) having improved dead fold characteristics, said film having a corrugation ratio between about 6 and 20, preferably between about 7 and 15.

BACKGROUND OF THE INVENTION

This invention relates to a packaging film and its preparation and, more particularly, to a corrugated polymer-coated packaging film.

The packaging of materials in films of various types is a major industry. The wide variety of types of items to be packaged requires many different kinds of films possessing highly specific combinations of properties. The packaging of snack foods, i.e., potato chips, popcorn, and the like, presents its own combination of requirements for the packaging film to be used. For example, it would be highly desirable that the film be adequate in barrier properties to preserve the packaged items from becoming stale. It is also desirable that the film be printable so that advertising indicia, price and the like can be indicated on the package. It is further desirable that the film have a rather high degree of stiffness so that packages of the snack foods can be made to "stand up" and thereby enhance their attractiveness in a commercial display. Finally, it is also desirable that a snack food packaging film in particular have a high degree of "dead fold" characteristics so that, once the package is opened and the contents partially consumed, the remaining items in the package can be substantially protected by creasing the open end one or more times. A film with good dead fold characteristics will not open up to any substantial degree at the folded end. Polymeric packaging films with good dead fold characteristics are uncommon. Even rarer are such packaging films which possess the combination of desired properties mentioned above.

SUMMARY OF THE INVENTION

It has been found that a vinylidene chloride polymer-coated polymeric film can be made having improved dead fold characteristics and thereby especially useful as a packaging film by corrugating said film to produce a corrugation ratio between about 6 and 20, preferably between about 7 and 15.

BRIEF DESCRIPTION OF THE DRAWING

FIG. 1 is a top view of a portion of a typical corrugated film in accordance with this invention.

FIG. 2 is a sectional view along cut 2—2 of FIG. 1.

FIG. 3 is a portion of the sectional view of FIG. 2 magnified for the purposes of clarity.

DETAILED DESCRIPTION OF THE INVENTION

The term "corrugated" is used herein to describe a film with a cross section such as that shown in FIG. 3 having from about 20 to about 40 corrugations per inch. Other geometrical configurations are possible (e.g., those shown in FIGS. 5, 6 and 7 of U.S. Pat. 3,244,799), provided they are substantially free from sharp edges.

The term "polymeric packaging film" includes regenerated cellulose films (cellophane) as well as films (preferably oriented) of polypropylene, polyesters, e.g., polyethylene terephthalate, high-density polyethylene, and laminates thereof. The polymeric material should be rather high in modulus, i.e., above about 80,000 p.s.i. The thickness of the films of this invention before corrugation ranges from about 0.25 to 5 mils, preferably 0.5 to 2 mils.

The term "vinylidene chloride polymer" as used herein means a copolymer of vinylidene chloride and at least one ethylenically unsaturated monomer copolymerizable therewith, useful for coating polymeric films, such as described in Owens, U.S. Pat. 3,428,483, and Settlage et al., French Pat. 2,013,705. Representative copolymers may be obtained by polymerizing a mixture of between about 80 and about 96.5 parts by weight (preferably 88 to 93 parts) of vinylidene chloride, between about 0.1 and about 5 parts by weight (preferably between 0.2 and 0.5) of either itaconic acid or acrylic acid, with the remainder being between about 3 and about 19.9 parts by weight of at least one other monomer copolymerizable therewith such as acrylonitrile, alkyl esters of either acrylic or methacrylic acids having from 1 to 18 carbon atoms in the alkyl group threof, phenyl methacrylate, cyclohexyl methacrylate, p-cyclohexylphenyl methacrylate, methacrylonitrile, methyl vinyl ketone, and vinyl chloride. Coatings from these polymers are also referred to as saran-type coatings and are extensively described in the art. The weight of the vinylidene chloride polymer coating on the films of this invention can vary widely according to choice; however, coating weights between about 1.25 and about 4 grams per square meter per side are oridinarily employed. A principal reason for the vinylidene chloride polymer is to provide a barrier to moisture vapor, etc.; therefore, it is possible that coatings of a polymer with equivalent barrier properties might also be used, particularly with polypropylene films which alone have above average barrier properties.

The term "dead fold" describes the tendency of the film to remain in a folded condition after it has been creased. With respect to this invention, the term "dead fold" always refers to a crease or fold made in the film transverse to the direction of the corrugation lines. A suitable dead fold test can be conducted as follows: A strip of film 3 inches by 1.5 inches is selected with the corrugation lines running in the long direction. The strip is folded transverse to the corrugation lines with a firm crease and a 1200 gram weight is placed across the fold line and permitted to rest for about 10 seconds. The weight is then removed and the strip is observed to note the angle formed at the fold line. If the angle is between zero degrees (no recovery from the fold) to about 30 degrees, the dead fold is regarded as excellent. If the folded-over portion recovers to an angle of about 30 to 90 degrees, the dead fold is regarded as moderate. Any angle formed in excess of about 90 degrees is regarded as an unacceptable amount of dead fold.

Referring now to the drawing, FIG. 1 shows a portion of a film 10 with the corrugations 11 running in the long direction. The thickness of the film before corrugation is represented in FIG. 3 by the letter A and the apparent thickness of the resulting corrugated film (i.e., the distance from the top of peak 12 to the bottom of peak 13)

is represented by the letter B. For the purposes of discussing this invention, the corugation ratio is defined as follows:

$$\text{Corrugation ratio} = \frac{\text{thickness of corrugated film}}{\text{thickness of initial film}} = \frac{B}{A}$$

It has unexpectedly been found in accordance with this invention that the improvement in dead fold properties is largely dependent upon the corrugation ratio of the film. More specifically, it has been found that an improvement in dead fold properties is observed when the corrugation ratio is at least about 6, preferably at least about 7. This figure is somewhat dependent upon flat film thickness in that thinner films may require a slightly greater corrugation ratio to produce a noticeable improvement in dead fold properties and thicker films may require a slightly lower ratio. Additionally, higher modulus films may not show a significant dead fold improvement at lower ratios. The upper limit on corrugation ratio is not particularly critical except that ratios of above 20 are exceedingly difficult to obtain without shearing the film coating. It is preferred that the corrugation ratio be not greater than about 15.

The film is corrugated in accordance with this invention by preheating between about 175° to 210° F. by over-and-under contact with one or more of a series of internally heated rollers or drums. The preheating temperature should be high enough to avoid coating blush but not so high as to damage the coating. The preheated film is then led partially around and between a pair of interfitting, meshing corrugating wheels which coact to press the heated film into the desired longitudinally grooved, laterally waved, corrugated shape. The deeper the grooves on the wheels, the greater the corrugation ratio obtained. The corrugating wheels are generally kept somewhere near room temperature by circulating tap water, and the temperature of both wheels is maintained substantially the same.

The corrugated films of this invention, in addition to having unexpectedly good dead fold properties, are surprisingly not usually degraded by the corrugation process with respect to water barrier properties, heat sealability, machine runnability, and printability. The machine direction stiffness is also improved as are flex durability, compressive resilience and dimensional stability. Thus, the films are useful to be formed into packages for snacks, e.g., tubular packages filled with the edible product and heat sealed by crimp sealing at each end according to methods well known to those skilled in the art. The corrugated films can also be laminted to uncorrugated films to provide a desirable combination of properties of a corrugated film on one surface and a smooth film on the other. Desirable visual effects may also be thus obtained.

The invention will now be described in connection with specific examples thereof wherein parts and percentages are by weight unless otherwise specified and the corrugated films all have about 32 corrugations per inch.

Example 1

A 130-gauge cellophane film 1.4 mils thick is selected bearing a vinylidene chloride polymer coating on each surface. The polymer is a copolymer of about 91.4% vinylidene chloride, 5.9% acrylonitrile, 2.0% methyl methacrylate and 0.7% itaconic acid. The coating weight per side ranges from about 2 to 2.5 grams/sq. meter. The modulus of the film is about 300,000 p.s.i. The film is corrugated as described hereinabove at a speed of about 330 feet per minute (f.p.m.). The preheat temperature is about 200° F. and the corrugating rolls are maintained at about room temperature. If corrugated to an apparent thickness of about 8 mils (the corrugation ratio being about 5.7), the dead fold is about moderate. At an apparent thickness of about 10 mils (corrugation ratio of about 7.1), the dead fold is typically excellent.

Example 2

A 250-gauge cellophane film 0.7 mil thick is selected bearing the vinylidene chloride polymer coating of Example 1 on each surface of a coating weight of about 1.5 grams/sq. meter. The modulus of the film is about 300,000 p.s.i. The film is corrugated as described hereinabove at a speed of about 350 f.p.m., a preheat temperature of about 185° F. and corrugating rolls at about room temperature.

If corrugated to an apparent thickness of about 5 mils (corrugation ratio of about 7), the dead fold is typically moderate; whereas at an apparent thickness of about 7.5 mils (corrugation ratio of about 10.7), it is typically excellent.

Example 3

A laminate of 50-gauge polyethylene terephthalate film and the 250-gauge cellophane film (uncoated) of Example 2 is prepared as in the example of assignee's U.S. application Ser. No. 93,806, filed Nov. 30, 1970, by L. C. Long et al. Each side is coated with 1.5 to 2 grams/sq. meter of the vinylidene chloride copolymer of said application of Long et al. The film thickness is about 1.3 mils. The film is corrugated as described hereinabove at a speed of about 400 f.p.m., a preheat temperature of about 185° F., and room-temperature corrugating rolls. At an apparent thickness of about 10 mils (corrugation ratio of about 8) dead fold is excellent.

Example 4

A 350-gauge, biaxially oriented, heat-set polypropylene film is selected having a coating on each side of a polymer of 70% vinylidene chloride, 10% ethyl acrylate, 15% methyl methacrylate, and 5% acrylic acid. The coating weight per side is about 2.5 grams/sq. meter and the film thickness is about 0.8 mil thick. The film modulus is about 250,000 p.s.i. The film is corrugated as described hereinabove at a speed of about 175 f.p.m.; the corrugating rolls are run at a slightly slower speed than the preheat rolls. The preheat temperature is about 180° F. with the corrugating rolls at room temperature. At an apparent thickness of about 4 mils (corrugation ratio of about 5), the dead fold is moderate; whereas at 6 mils (corrugation ratio of 7.5), the dead fold is excellent.

Example 5

The corrugated cellophane film of Example 2 can be laminated to a corresponding but uncorrugated cellophane film using a conventional polyurethane-type cellophane adhesive ("Adcote 76C333," commercially available from Morton Chemical Co.). The resulting laminate has excellent dead fold when the corrugation ratio of the corrugated film part of the laminate is about 10.

As many widely different embodiments of this invention may be made without departing from the spirit and scope thereof, it is to be understood that this invention is not limited to the specific embodiments thereof except as defined in the appended claims, and all changes which come within the meaning and range of equivalence are intended to be embraced therein.

I claim:

1. A corrugated, vinylidene chloride polymer-coated, polymeric packaging film having improved dead fold characteristics, said film having a corrugation ratio between about 6 and 20.

2. A corrugated film as defined in claim 1 wherein said corrugation ratio is between about 7 and 15.

3. A corrugated film as defined in claim 1 having a thickness between about 0.5 and 2 mils.

4. A corrugated film as defined in claim 1 wherein said film is selected from cellophane, polyester, polypropylene, high-density polyethylene films, and laminates thereof.

5. A corrugated film as defined in claim 1 wherein said film is laminated to uncorrugated polymeric film.

6. A package for materials consisting essentially of an enclosure formed by the film of claim 1.

7. A method of improving the dead fold properties of a vinylidene chloride-coated polymeric packaging film which consists in corrugating said film to a corrugation ratio between about 6 and 20.

8. A method as defined in claim 7 wherein the corrugation ratio is between about 7 and 15.

9. A method as defined in claim 7 wherein the thickness of said film is between about 0.5 and 2 mils.

10. A method as defined in claim 7 wherein said film is selected from cellophane, polyester, polypropylene, high-density polyethylene films, and laminates thereof.

References Cited

UNITED STATES PATENTS

| 2,679,887 | 6/1954 | Doyle et al. | 156—183 |
| 3,616,155 | 10/1971 | Chavannes | 161—127 X |

FOREIGN PATENTS

| 597,851 | 10/1960 | Canada | 264—286 |

WILLIAM A. POWELL, Primary Examiner

U.S. Cl. X.R.

156—206, 210, 306; 161—137; 264—286

UNITED STATES PATENT OFFICE
CERTIFICATE OF CORRECTION

Patent No. 3,684,642      Dated August 15, 1972

Inventor(s) Fulton Floyd Rogers, Jr.

It is certified that error appears in the above-identified patent and that said Letters Patent are hereby corrected as shown below:

At column 4, lines 74 and 75, claim 5 should be omitted.

Signed and sealed this 3rd day of April 1973.

(SEAL)
Attest:

EDWARD M. FLETCHER, JR.
Attesting Officer

ROBERT GOTTSCHALK
Commissioner of Patents